Nov. 15, 1949     E. P. HARTRY     2,488,123
VEHICLE HAVING COLLAPSIBLE AND
EXTENSIBLE REAR SECTION
Filed Jan. 26, 1946
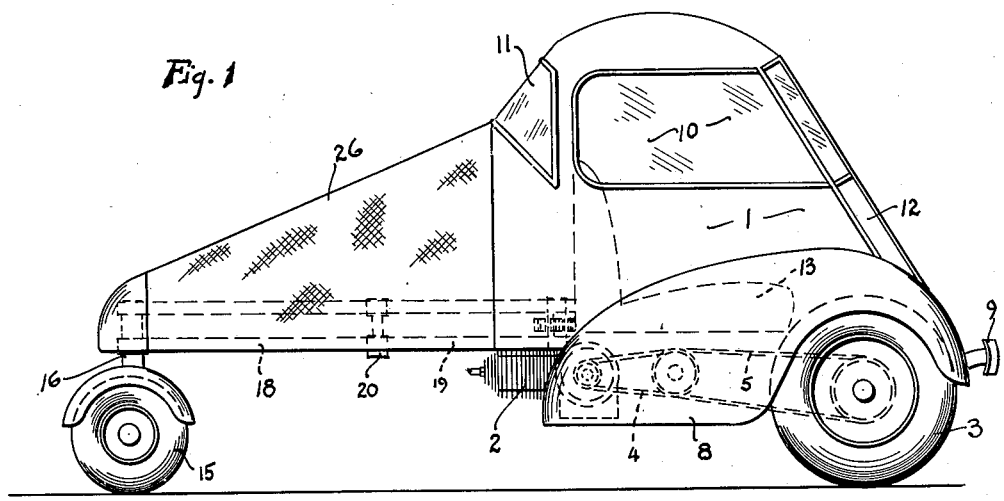
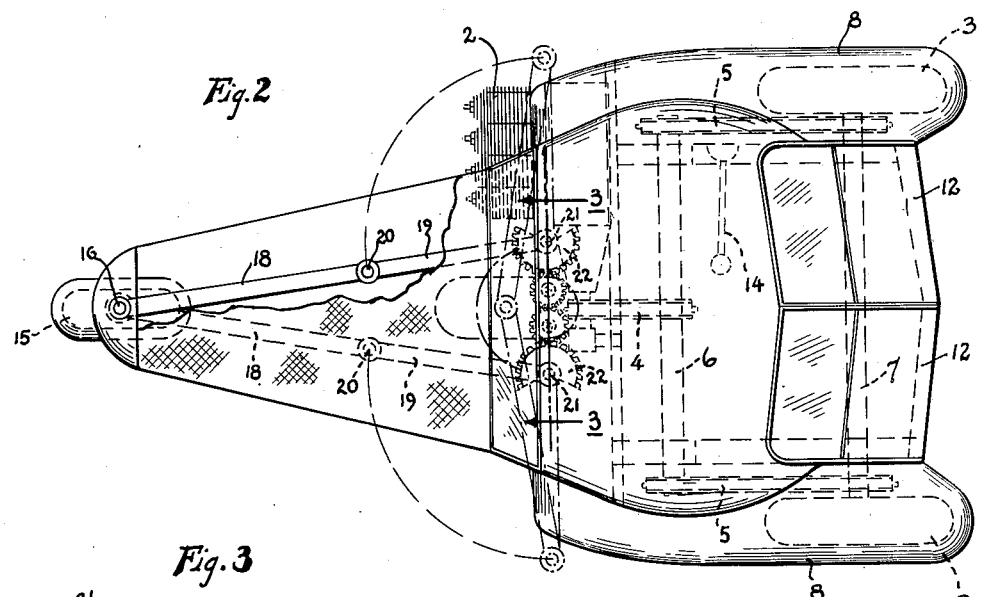
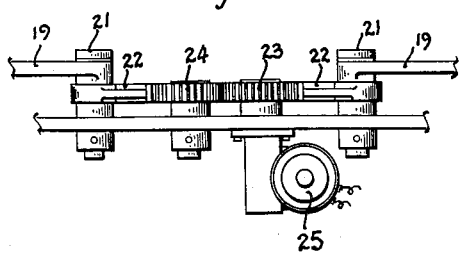
Inventor
EARL P. HARTRY
By Lyon & Lyon
Attorneys Patented Nov. 15, 1949

2,488,123

UNITED STATES PATENT OFFICE 2,488,123

VEHICLE HAVING COLLAPSIBLE AND EXTENSIBLE REAR SECTION

Earl P. Hartry, Los Angeles, Calif.

Application January 26, 1946, Serial No. 643,505

7 Claims. (Cl. 280—34)

This invention pertains to a vehicle and more particularly to a passenger carrying vehicle such as an automobile.

One of the big problems of automobile traffic at the present time is the difficulty in parking automobiles as well as lack of space for turning and handling the ordinary automobile on the present streets.

It is one object of this invention to provide an automotive vehicle which will overcome the present traffic difficulties of parking and turning by providing a vehicle which may be lengthened or shortened at will and which is of the tricycle type including a single wheel at the rear rather than the forward end of the automobile whereby the vehicle may be swung or turned in an extremely short space.

Various other objects and advantageous features of this invention may be had from the following description, and one embodiment thereof may be seen in the accompanying drawings wherein similar characters of reference designate corresponding parts, and wherein:

Fig. 1 is a side view of a vehicle embodying the features of this invention.

Fig. 2 is a top plan view thereof.

Fig. 3 is a fragmentary view taken on the line 3—3 of Fig. 2 and shows the power mechanism for shortening or lengthening the vehicle.

Referring to the drawings, I have shown a vehicle including a body 1 of rigid material which is supported by a suitable frame that also carries a power unit 2, two spaced forward wheels 3 and suitable driving connections between the power unit 2 and the wheels 3, such driving connections being shown for illustrative purposes as being a V-belt or chain drive 4 from the power unit 2 to a differential and suitable chain or V-belt driving connections 5 connecting the shaft 6 operated by the differential to the axle 7 on which the wheels 3 are mounted. The vehicle also is equipped with the conventional fenders 8, bumper 9, side windows 10 and rear window 11. However, this vehicle differs over the conventional form of vehicle by having two doors 12 at the forward end of the vehicle, either one of which, or both of which may be opened to permit entry into the interior of the vehicle, and access to a seat 13. Any suitable guiding means may be provided. For illustrative purposes such guiding means here consist of a steering bar 14, and any suitable control means for the power unit may be utilized, or the power unit may be of any desired type.

In accordance with this invention, the single rear wheel 15 is swivelled by means of a post 16 extending upwardly through a collapsible or expandable frame made up of bars 18 which are pivoted together at one of their ends on the post 16 and at their opposite ends are pivotally linked with bars 19 as at 20. The opposite ends of the bars 19 are pivoted on the frame of the vehicle as at 21 and have secured thereto segmental gears 22 which mesh with respective pinion gears 23 and 24; such gears 23 and 24 intermeshing with each other whereby rotation of one of the gears will result in rotation of the other gear and both of the segments 22. As illustrated, an electric motor 25 is operatively connected to the post upon which the pinion gear 23 is mounted, such motor being preferably of the reversible type so that the pinion gear 23 and the gear 24 and segments intermeshing together for simultaneous operation all will be operated by the single motor 25. It will be understood that any type of suitable actuating means rather than the motor 25 may be utilized. Any suitable control means may be provided for effecting operation of the motor 25. The rearward section of the vehicle extending from the body 1 to the single wheel 15 is preferably covered by a fabric covering 26, such covering also serving to protect the collapsible and expandable frame on which the single wheel 15 is mounted.

In the operation of this device, the collapsible and expandable frame supporting the single wheel 15 is preferably extended as shown in Fig. 1 for driving purposes, it being understood that the steering may be accomplished either from the rearward single wheel or through the forward wheels, although it is preferably accomplished from the rearward wheel by a cable from the steering bar thereto. Assuming that it is desired to park this device in a limited space, the vehicle is driven into the space either with the side of the vehicle parallel to the curb or the front end of the vehicle heading into the curb, at which time the motor 25 is caused to operate and, through the pinion gears 23 and 24 and the segmental gears 22, cause the arms 19 to swing outwardly away from each other into the dotted line position shown in Fig. 2 wherein they are substantially parallel with the rearward end of the vehicle 1 for driving purposes.

With such construction it will be seen that the major difficulties of parking and operating a vehicle in congested traffic are greatly eased. In other words, a vehicle is provided which, for ordinary operating purposes, may be of a length conducive to good riding and such vehicle may be shortened at will for parking or turning purposes by contracting or expanding the frame carrying the single rearward wheel so as to draw the wheel inwardly toward the rear end of the vehicle, or extend the wheel outwardly from the rear end of the vehicle. The advantages of this type of vehicle will be readily apparent.

Having fully described my invention, it is to be understood that I do not wish to be limited to the details herein set forth, but my invention is of the full scope of the appended claims.

I claim:

1. A vehicle comprising a substantially rigid forward section arranged to seat passengers and forming the forward end of the vehicle, a collapsible and expandable rear section movable independently of said forward section, a pair of wheels supporting the forward section and a single wheel supporting the rearward section, and a pivoted linkage mechanism operable by a person in said forward section to collapse and expand said rear section.

2. A vehicle comprising a substantially rigid forward section arranged to seat passengers and forming the forward end of the vehicle, a collapsible and expandable rear section movable independently of said forward section, a pair of wheels supporting the forward section and a single wheel supporting the rearward section, said single wheel supporting the rear section being mounted for swivelling movement, and a pivoted linkage mechanism operable by a person in said forward section to collapse and expand said rear section.

3. A vehicle comprising a substantially rigid forward section arranged to seat passengers and forming the forward end of the vehicle, a collapsible and expandable rear section movable independently of said forward section, a pair of wheels supporting the forward section, a single wheel supporting the rearward section and a flexible covering for said rear section, and a pivoted linkage mechanism operable by a person in said forward section to collapse and expand said rear section.

4. A vehicle comprising a substantially rigid forward section arranged to seat passengers and forming the forward end of the vehicle, a collapsible and expandable rear section movable independently of said forward section, a pair of wheels supporting the forward section, a single wheel supporting the rearward section, and a foldable flexible covering for said rear section, and a pivoted linkage mechanism operable by a person in said forward section to collapse and expand said rear section.

5. A vehicle comprising a substantially rigid enclosed frame section arranged to seat passengers forming the forward end of a vehicle, at least one door at the forward end of a vehicle through which said passengers may enter and leave in a direction corresponding to the normal direction of travel of the vehicle, a collapsible and expandable rear section movable independently of said rigid frame section, and wheels supporting the respective sections.

6. A vehicle comprising a substantially rigid enclosed forward section arranged to seat passengers and forming the forward end of the vehicle, at least one door at the forward end of said vehicle through which said passengers may enter and leave in a direction corresponding to the normal direction of travel of the vehicle, a collapsible and expandable rear section movable independently of said forward section, a pair of wheels supporting the forward section, a single wheel supporting the rearward section, and power means arranged to collapse and expand said rear section.

7. A vehicle comprising a substantially rigid enclosed frame section arranged to seat passengers forming the forward end of the vehicle, at least one door at the forward end of said vehicle with its plane slanting downwardly and forwardly through which said passengers may enter and leave in a direction corresponding to the normal direction of travel of the vehicle, a collapsible and expandable rear section movable independently of said rigid frame section, and wheels supporting the respective sections.

EARL P. HARTRY.

REFERENCES CITED

The following references are of record in the file of this patent:

UNITED STATES PATENTS

| Number | Name | Date |
|---|---|---|
| 14,831 | Rosencrantz | May 6, 1856 |
| 699,186 | Katzke | May 6, 1902 |
| 1,305,162 | Puff | May 27, 1919 |
| 1,366,771 | Devencenzi | Jan. 25, 1921 |
| 1,419,160 | McKinnon | June 13, 1922 |

FOREIGN PATENTS

| Number | Country | Date |
|---|---|---|
| 245,389 | Great Britain | Jan. 7, 1926 |